Patented Jan. 19, 1932

1,841,842

UNITED STATES PATENT OFFICE

SIDNEY MUSHER, OF WASHINGTON, DISTRICT OF COLUMBIA

FOOD PRODUCT

No Drawing. Application filed December 7, 1927. Serial No. 238,464.

This invention relates to food products in which crushed sesame seed is mixed or combined with a milk product to form a compound adapted to be used as a drink with chocolate, for example, or in baking or cooking wherever the milk product itself is ordinarily used.

An object of the invention is the inhibition of rancidity to which milk products are extremely susceptible.

A further object is the provision of a food product which not only possesses a new and pleasing flavor but wherein the deficiencies in vital food elements in the principal constituent thereof, the milk product, are made up.

This invention also serves to eliminate the objections in taste which many persons have to milk products.

A still further object is the provision of an improved process of making the product.

It is quite well known that powdered milks are extremely susceptible to rancidity and consequent spoilage. I have found, however, that by my method of mixing a milk product with crushed sesame seed, the fat globules of the milk are surrounded by and blended with the fat and the starch of the seed cake and the milk fat is thereby rendered less open to oxidation and to rancidity.

I combine sesame seed and the milk product by first thoroughly mixing the sesame seed in a crushed state with the milk in a liquid state and thereby creating an emulsion. This emulsion is then sprayed in order to remove the water from the milk. The product of the spraying step of the process is the substantial powdery composition forming the subject matter of this invention. Whenever possible, the first step of emulsification may be eliminated from the process since emulsification will necessarily take place to a satisfactory extent in the spraying or drying process.

Through this method, the excess moisture which cannot be eliminated by the ordinary methods of powdering milks is absorbed by the seed and hence prevented from coming into contact with the milk fat. Contact of moisture with the fat of the milk is a circumstance which must be guarded against in order to inhibit rancidity of the milk.

Although it has been stated that the milk product, which may be whole milk, skim milk, cream, or other milk products is mixed when in its liquid state, it is obvious that it may be mixed directly with the crushed sesame seed when in its powdered state. Furthermore, although crushed sesame seed has proven to be outstandingly superior to any other seed cake, nut butter, or olive butter from the standpoint of inhibiting rancidity of the milk or cream fat through the absorption of the moisture not removed by the drying or spraying process, any of the other types of cakes or butters, or combinations of these types may be used. They include peanut butter, sunflower cake, olive butter, or substances containing a large percentage of crushed sesame seed such as halvah.

I have already described in my application No. 229,800, filed October 29, 1927, that the crushed sesame seed has the property of inhibiting rancidity in other butters but by the present invention I am able to adapt this property to render milk powders capable of resisting rancidity. Although other butters or seed cakes may be substituted for crushed sesame seed to some advantage, it does not create quite the same beneficial results as the sesame seed or sesame-seed-containing substances.

The food product resulting from the process described has an unexpectedly pleasant flavor wherever it is used, whether when mixed with chocolate to form a drink or in cooking with macaroni, by way of example.

The crushed sesame seed has been proven to have further highly advantageous properties when mixed with skim milk, since it provides certain vital food elements in which skim milk is known to be deficient. For instance, the fat of the cake makes up somewhat, depending on the proportion used, for the loss in fat content of the skim milk, especially where the fat content of the skim milk is very low.

There is a large class of people who abstain totally from milk products solely by reason of objections to the taste of the raw product.

When these products are combined or mixed with the sesame seed, it has been found that this repulsive effect has been eliminated and the milk product rendered capable of being taken into the system without difficulty.

Depending upon the flavor desired, any one of a number of different butters may be added to the milk products. Sesame seed is perhaps the most pleasant of the group and it lends a flavor which is not rendered by the use of the oil of the sesame seed alone. The relative proportions of the substances to be mixed with the milk products are determined largely by the flavor or degree of flavor desired. A product formed of 80% skim milk and 20% crushed sesame seed has been found to have an excellent flavor.

Having now fully described my invention and the manner of carrying the same into effect, what I claim is:

1. The method of inhibiting rancidity in a milk product having a fat content which is normally subject to rancidity comprising mixing such milk product with an amount of crushed sesame seed sufficient to substantially inhibit rancidity in such milk product.

2. The method of inhibiting rancidity in a milk product having a fat content which is normally subject to rancidity comprising emulsifying such milk product with such amount of crushed sesame seed as will substantially inhibit rancidity in such milk product, and drying the emulsion.

3. A dry powder food product comprising an intimate mixture of a milk product having a fat content normally subject to rancidity and crushed sesame seed in proportion sufficient to inhibit rancidity in such product.

4. A food product comprising an intimate mixture of a liquid milk product having a fat content normally subject to rancidity and crushed sesame seed in proportion sufficient to inhibit rancidity in such product.

SIDNEY MUSHER.